United States Patent
Sisson

(10) Patent No.: US 8,085,562 B2
(45) Date of Patent: Dec. 27, 2011

(54) MERGED RAMP/OSCILLATOR FOR PRECISE RAMP CONTROL IN ONE CYCLE PFC CONVERTER

(75) Inventor: Paul Sisson, Exeter, RI (US)

(73) Assignee: International Rectifier Corporation, El Segundo, CA (US)

( * ) Notice: Subject to any disclaimer, the term of this patent is extended or adjusted under 35 U.S.C. 154(b) by 815 days.

(21) Appl. No.: 12/112,526

(22) Filed: Apr. 30, 2008

(65) Prior Publication Data

US 2009/0273330 A1   Nov. 5, 2009

(51) Int. Cl.
*G05F 1/70*   (2006.01)
(52) U.S. Cl. ............. 363/89; 323/207; 323/288
(58) Field of Classification Search .......... 323/288, 323/207, 222; 363/89; 332/109–110
See application file for complete search history.

(56) References Cited

U.S. PATENT DOCUMENTS

| 6,366,070 | B1 * | 4/2002 | Cooke et al. | 323/284 |
| 7,106,130 | B2 * | 9/2006 | Gan et al. | 330/10 |
| 2006/0043956 | A1 | 3/2006 | Clavette | |

\* cited by examiner

*Primary Examiner* — Harry Behm
(74) *Attorney, Agent, or Firm* — Farjami & Farjami LLP

(57) ABSTRACT

A one cycle power factor correction converter circuit comprising a switch for controlling a DC output voltage of the converter circuit, the switch being switched by a drive signal having a frequency determined by a clock signal; the converter circuit being provided with a DC input voltage and producing the DC output voltage, the DC input voltage being rectified from an AC input; a controller circuit for controlling an on-time or off-time of the switch to set the output voltage and to achieve power factor correction at the AC input; the controller circuit comprising an error amplifier receiving a feedback voltage from the output of the converter circuit and a reference voltage and producing an error signal; a ramp generator receiving the error signal and generating a first ramp signal by integrating a signal related to the error signal; a pulse width modulation circuit receiving the first ramp signal and a signal related to the error signal and producing a pulse width modulated signal by comparing the first ramp signal and the signal related to the error signal; the pulse width modulated signal determining the on-time or off-time of the switch to control the output voltage with power factor correction; further comprising a circuit for terminating the first ramp signal when a predetermined inequality exists between the first ramp signal and a reference signal and for developing the clock signal from the first ramp signal.

22 Claims, 5 Drawing Sheets

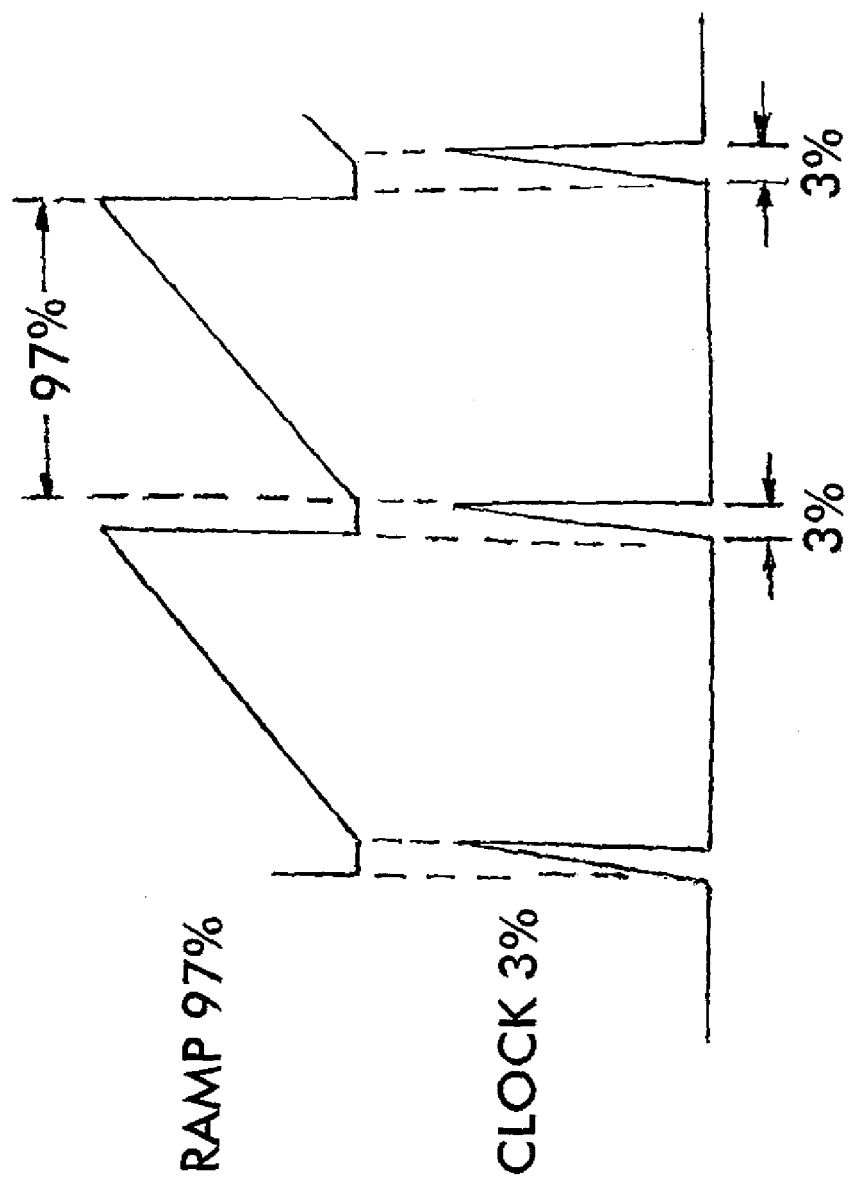

US 8,085,562 B2

MERGED RAMP/OSCILLATOR FOR PRECISE RAMP CONTROL IN ONE CYCLE PFC CONVERTER

CROSS-REFERENCE TO RELATED APPLICATIONS

The present application is related to U.S. application Ser. No. 11/207,509, filed Aug. 19, 2005, entitled METHOD AND APPARATUS FOR CALIBRATING A RAMP SIGNAL, U.S. Publication No. 2006/0043956, the entire disclosure of which is incorporated by reference herein.

BACKGROUND OF THE INVENTION

The present invention relates to one cycle (also known as single cycle) power factor correction (PFC) converters, and in particular, to a simplified circuit for establishing the ramp signal and clock signal in such converter circuits. In particular, the present invention provides a method and circuit for generating a combined ramp and oscillator signal for such converter circuits.

A critical requirement to achieve near unity power factor, when utilizing the single cycle control architecture, is to establish a pulse width modulation (PWM) ramp reference that integrates the error signal over the switching period (T) of the controller. In this architecture, the bandwidth of the error amplifier that establishes the error signal (COMP) is rolled off such that it is much lower than the switching frequency of the controller. Thus, from one cycle to the next there is little or no change in the COMP signal so it can be considered as a nearly DC signal.

FIG. 1 shows the expected ideal behavior of the ramp signal for two different error amplifier COMP signals, VCOMP1 and VCOMP2. FIG. 2 shows a prior art single cycle control power factor correction boost converter circuit. FIG. 3 shows the internal circuitry of the controller 1 of FIG. 2.

The controller 1 of FIG. 2 controls the switch Q1 to achieve power factor correction. Energy is stored in the inductor L when the switch Q1 is turned on and when it is turned off, the charge in the inductor is transferred to the output and stored in the storage capacitor C to power the load.

The controller 1 operates to increase the power factor of the circuit so that the load approximates a purely resistive load as reflected by the current at the AC input being nearly in phase with the AC voltage.

FIG. 3 shows details of the controller 1 of FIG. 2. The feedback voltage is provided at terminal VFB via the voltage divider R1, R2 and R3 provided across the output of the converter. See FIG. 2. The voltage is fed to an error amplifier EA where it is compared to a reference voltage VREF. The reference voltage establishes the desired converter output voltage. The error signal COMP signifies the deviation of the output voltage from the desired output voltage. The error amplifier output is designated as the voltage COMP. The error amplifier output COMP is provided to a GM amplifier 50 that converts the COMP voltage to a current which charges a capacitor C provided at its output. The capacitor C integrates the input of the amplifier 50 producing a ramp signal RAMP. The ramp signal is fed to a PWM comparator 60 where the ramp signal is compared to the adjusted error amplifier's signal COMP which has been adjusted by a summing stage 52 based upon the sensed inductor current at ISNS sensed across a resistor RS by current sense amplifier CSA. See FIG. 2. In the PWM comparator 60, the comparison of the adjusted error amplifier signal 61 with the ramp produces a pulse when the ramp exceeds this adjusted error amplifier signal 61. The pulse at the output of the PWM comparator 60 is fed via gates 62 and 63 to PWM latch 65 where it resets and turns off the gate drive to the switch Q1 via gate 64 and driver 67. The gate drive of the switch Q1 is turned on by a clock signal provided by a clock oscillator 70 at the beginning of the clock cycle. Accordingly, when the clock pulse occurs, the latch 65 sets the gate high turning the switch Q1 on and when the ramp signal exceeds the error signal, the latch is reset and the gate drive is removed. When the latch is reset, a reset signal is provided to discharge the capacitor C via a switch 80, thereby allowing the single cycle control cycle to begin again.

FIG. 3 shows certain additional fault protective functions including an overvoltage protection OVP function which will reset the latch 65 and turn off the gate drive in the event of an overvoltage condition at the output as determined by the resistor divider comprising resistors R4, R5 and R6 (FIG. 2). In addition, a fault protection, open loop protection and output undervoltage circuit is provided that monitors the feedback signal to provide a fault signal in the event of a fault to turn off the gate drive. Further, there is typically provided a UVLO circuit and a maximum duty cycle unit, as shown in FIG. 3.

Turning now to FIG. 1, at the beginning of each clock cycle, the ramp starts from zero volts and then linearly rises over the switching period. To achieve the desired wave shape, the slope of the ramp must be such that the ramp terminates at VCOMP at the end of the cycle. At the end of the cycle, the ramp is reset to zero volts and the cycle starts again. In the drawing, two different ramps for two different COMP voltages are shown. Both start at zero yet terminate at the same time (T) at the appropriate voltage VCOMPX.

The traditional architecture used to implement the one cycle PFC controller involves providing the clock circuit 70 and the ramp circuit as shown in FIG. 3 which closely matches the components of the clock circuit. The requirement for good power factor correction is that at the end of the clock cycle the ramp voltage equals VCOMP. Any error in this voltage results in significant loss of power factor. Unavoidable mismatches between clock and ramp voltage result in significant loss of power factor. Unavoidable mismatches between clock and ramp components as well as offset terms within amplifiers when utilizing this traditional method lead to significant errors in the ramp. Static trimming of the product helps to mitigate these errors at some operating point. However, it cannot provide sufficient mitigation over the full operating range of the circuit, and is useless if the frequency is user-programmable.

In U.S. patent application Ser. No. 11/207,509 referred to above, an active calibration of the ramp is described. This method comes very close to achieving the desired ramp. In this technique, the ramp slope is adjusted cycle to cycle by a circuit that compares a ramp peak to the error signal. If the slope is too flat, the calibrator increases it on the next cycle. If the slope is too steep, then the slope is decreased in the next cycle. Offset errors and propagation delay issues in the calibration circuit can lead to errors in the ramp. However, these errors are small enough so that this technique provides accurate PFC. Drawbacks to this technique are first, dithering in the calibration circuit leads to dithering in the duty cycle that many systems cannot tolerate and secondly, the circuit is more complex so the silicon required to build the ramp and calibrator can be significant.

SUMMARY OF THE INVENTION

The present invention provides a simplified solution to the problems of the prior art circuits. The present invention provides accurate power factor correction without dithering induced by calibration and without the cost associated with the ramp generator and calibrator of the prior art solution.

The present invention utilizes the clock circuit as the ramp generator. The system clock circuit is a ramp which starts at zero volts and terminates at VCOMP. By combining this functionality, the ramp, by necessity, terminates at the time T. The clock, by necessity, terminates at VCOMP. Since T and the ramp signal are locked within the same circuit, then the single cycle requirement that the ramp be an integration of the error signal (COMP) over the switching period (T) is achieved.

The circuit uses an integrator capacitor to develop both the ramp and define the operating frequency. At the start of the cycle, the capacitor is discharged to zero volts. The discharge mechanism is released and the capacitor charges with a current that is proportional to COMP, in particular, COMP/R, R being defined by a resistance. Using a comparator, the ramp is compared to the COMP signal. When the ramp crosses the voltage COMP, the end of the period (T) is flagged, the capacitor is reset and the cycle is started again.

The components used according to the invention are similar to those used in the traditional clock/oscillator. In this approach, the reference voltage that is used to set the charge current and threshold is the error signal COMP itself, in contrast to the prior art that uses a static on-chip reference.

There are some practical limitations as to how low the COMP voltage can go while maintaining a stable operating frequency. Also, this method is only appropriate for systems in which the voltage bandwidth is much less than the operating frequency (small cycle to cycle variation in COMP). If these points are not of concern, then the present invention provides a less expensive, more accurate method without calibration dithering for achieving one cycle PFC than previous methods employ.

Other features and advantages of the present invention will become apparent from the following description of the invention which refers to the accompanying drawings.

BRIEF DESCRIPTION OF THE DRAWING(S)

The invention will now be described in greater detail in the following detailed description with reference to the drawings in which:

FIG. 4A shows how the clock period is developed from two ramp signals; and

Other objects, features and advantages of the invention will be apparent from the detailed description which follows.

DETAILED DESCRIPTION OF PREFERRED EMBODIMENTS OF THE INVENTION

Figure 4:
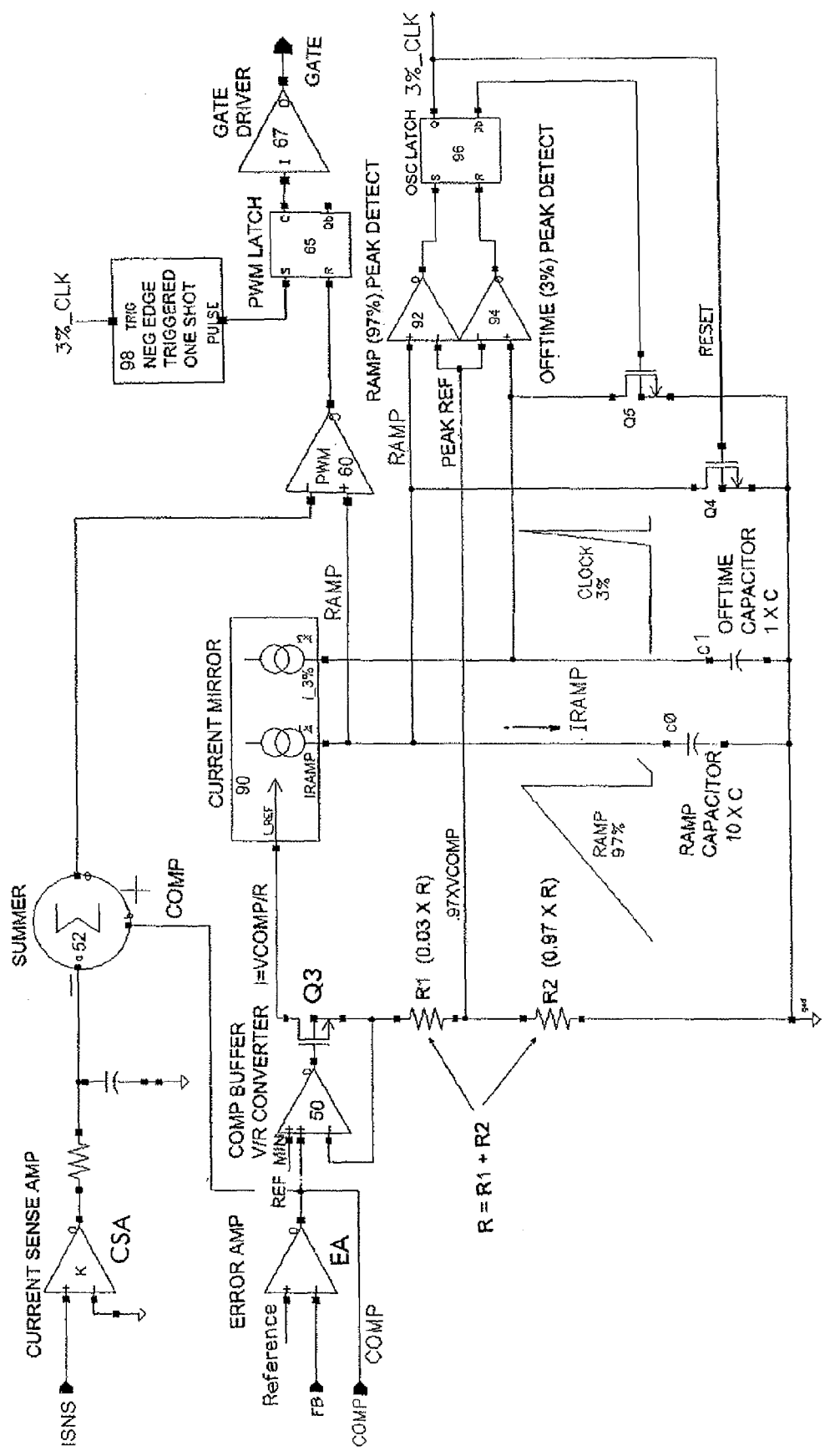
FIG. 4 shows a block diagram of one example of a controller according to the present invention.

With reference to FIG. 4, a one cycle control circuit employing the combined ramp generator and oscillator of the invention is shown.

Figure 1:
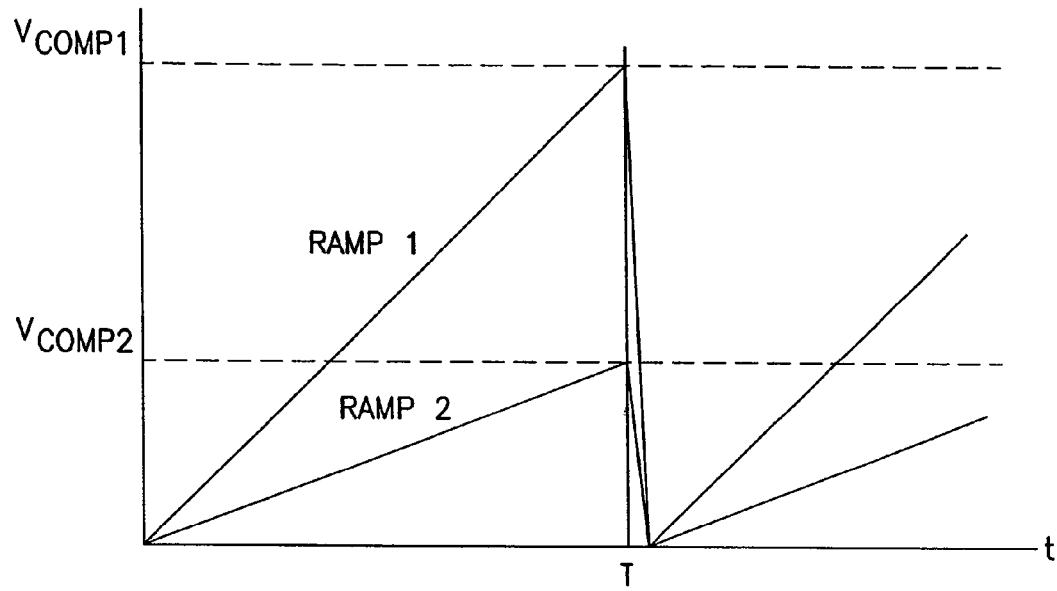
FIG. 1 shows explanatory ramp signals and error voltages in a one cycle PFC controller.
Figure 2:
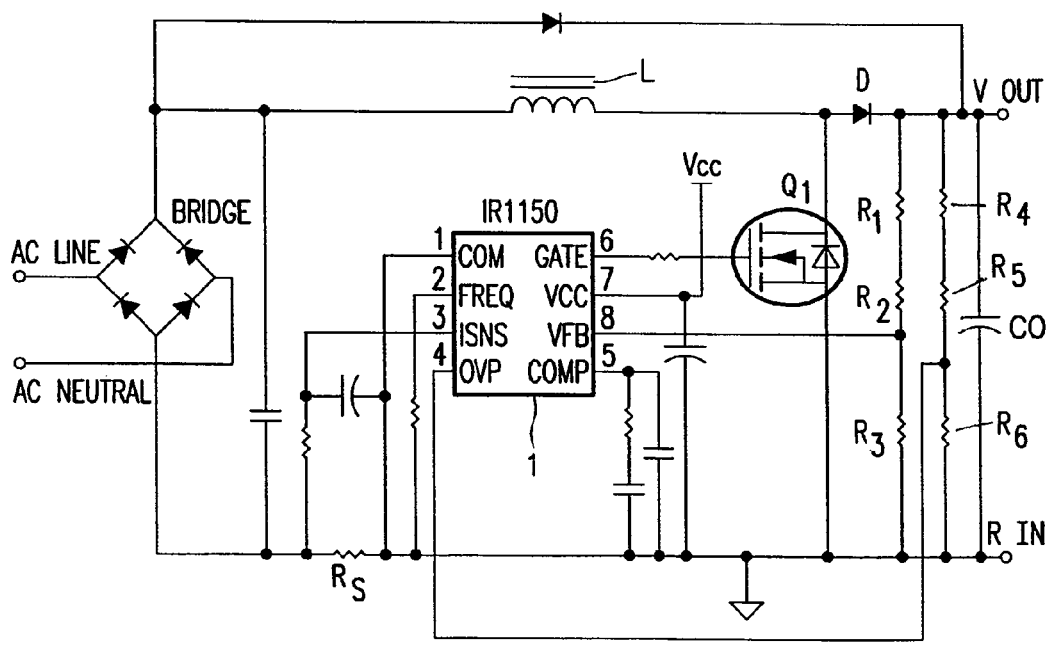
FIG. 2 shows a prior art one cycle power factor control boost converter circuit.
Figure 3:
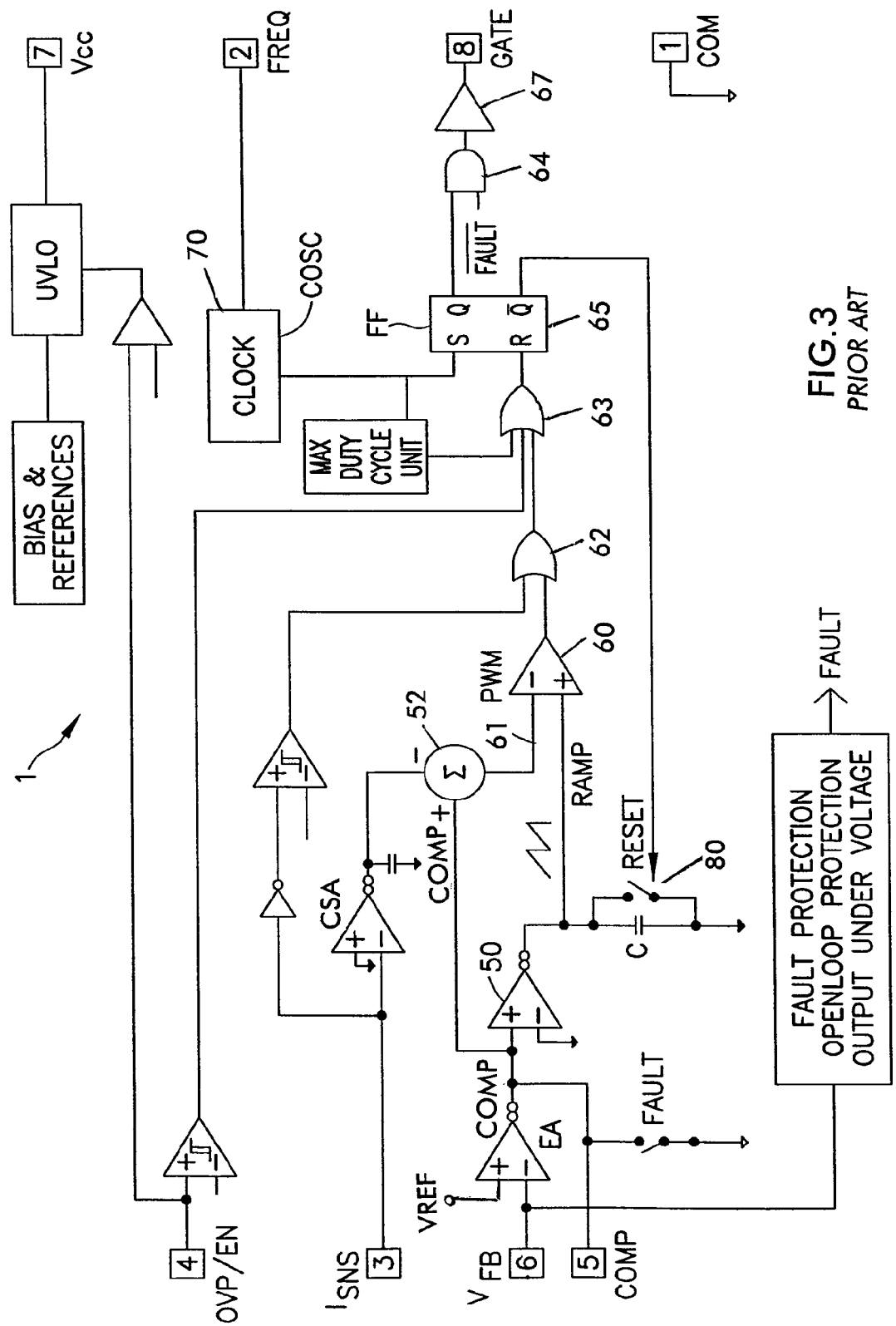
FIG. 3 shows the block diagram of the prior art controller.

The error amplifier EA is the same as in the prior art circuit of FIG. 3. The error amplifier output COMP is provided to the amplifier 50 as in the prior art circuit. The output of the amplifier 50 sets a current in a resistor R(R1+R2) through a switch Q3. The resistor R may be variable to determine the reference current. The current in the resistor R is provided though a current mirror 90, in the illustrated embodiment, a one-to-one current mirror. The current mirror sets up a charging ramp current in the capacitor CØ. The current is designated IRAMP. This establishes a ramp current through the capacitor CØ. The ramp voltage waveform RAMP is provided to the PWM comparator 60. The error signal COMP (as adjusted by the sensed output current in summing stage 52) is compared to the RAMP. When the RAMP exceeds the adjusted error signal, the PWM comparator 60 toggles the PWM LATCH 65, which is gated through to turn the transistor switch Q1 off.

At the same time, the ramp voltage RAMP defines a 97% interval of the system clock. RAMP is provided to the RAMP PEAK DETECT comparator 92 where the ramp voltage is compared to the divided vcomp reference voltage .97XVCOMP. R1 and R2 divide the COMP signal reference to 97% to mitigate the Power Factor Error induced by the 97% maximum duty cycle of the oscillator. When the ramp voltage crosses the .97XVCOMP reference, the OSC LATCH 96 is set. The Q output of this latch goes high and provides a 3%_CLK signal and also drives Q4 which RESETS (discharges to 0V) the ramp. When the Q output of the OSC LATCH 96 goes high the Qb output goes low and turns Q5 off. When Q5 turns off, C1 is released and is charged by a second current from the CURRENT MIRROR 90 which is three times larger than the ramp current. C1 is one tenth the size of C0 so the voltage CLOCK 3% rises at thirty times the rate of the ramp, as shown in FIG. 4A at 37 CLOCK. 37 CLOCK is provided to the OFFTIME PEAK DETECT comparator 94 where it is compared to the reference voltage .97XVCOMP. When the 37 CLOCK signal crosses the reference, it resets the OSC LATCH 96 which toggles the Q output Low terminating the 37 CLOCK pulse and turns off Q4 which releases the RAMP to begin again. The Qb signal goes high and turns on Q5 which discharges C1. Since the threshold of both comparators 92 and 94 is the same and since both capacitors C0 and C1 begin to charge from the same voltage 0V, and since C1 charges at a rate that is thirty times that of C0, a signal of 3% duty cycle is created. Both ramp times together equal the entire clock period. This provides a maximum duty cycle of 97%.

At the same time, when the latch 96 resets, a one shot 98 provides a pulse to the latch 65, resetting the latch and providing a new PWM gate drive pulse to the switch Q1. Thus, the clock signal for setting the latch 65 has been generated from the ramp signal itself and thus the ramp signal and clock are locked together. The clock signal period is the combined ramp times of the two ramps (97% RAMP and 3% CLOCK).

At this point, the cycle begins again with the capacitor CØ integrating the mirrored error signal again until the RAMP signal exceeds the error signal at which point the integration and RAMP signal terminates and transistor Q1 is again turned off. Then the 3% CLOCK ramp begins and terminates, as explained above.

It can be seen from the above that the ramp signal RAMP functions both as the signal VRAMP in the circuit of FIG. 3 as well as generating the clock signal VOSC. Thus, a simplified circuit providing both the ramp and the oscillator signals and wherein the ramp and oscillator signals are defined by each other is provided by this circuit.

Figure 5:
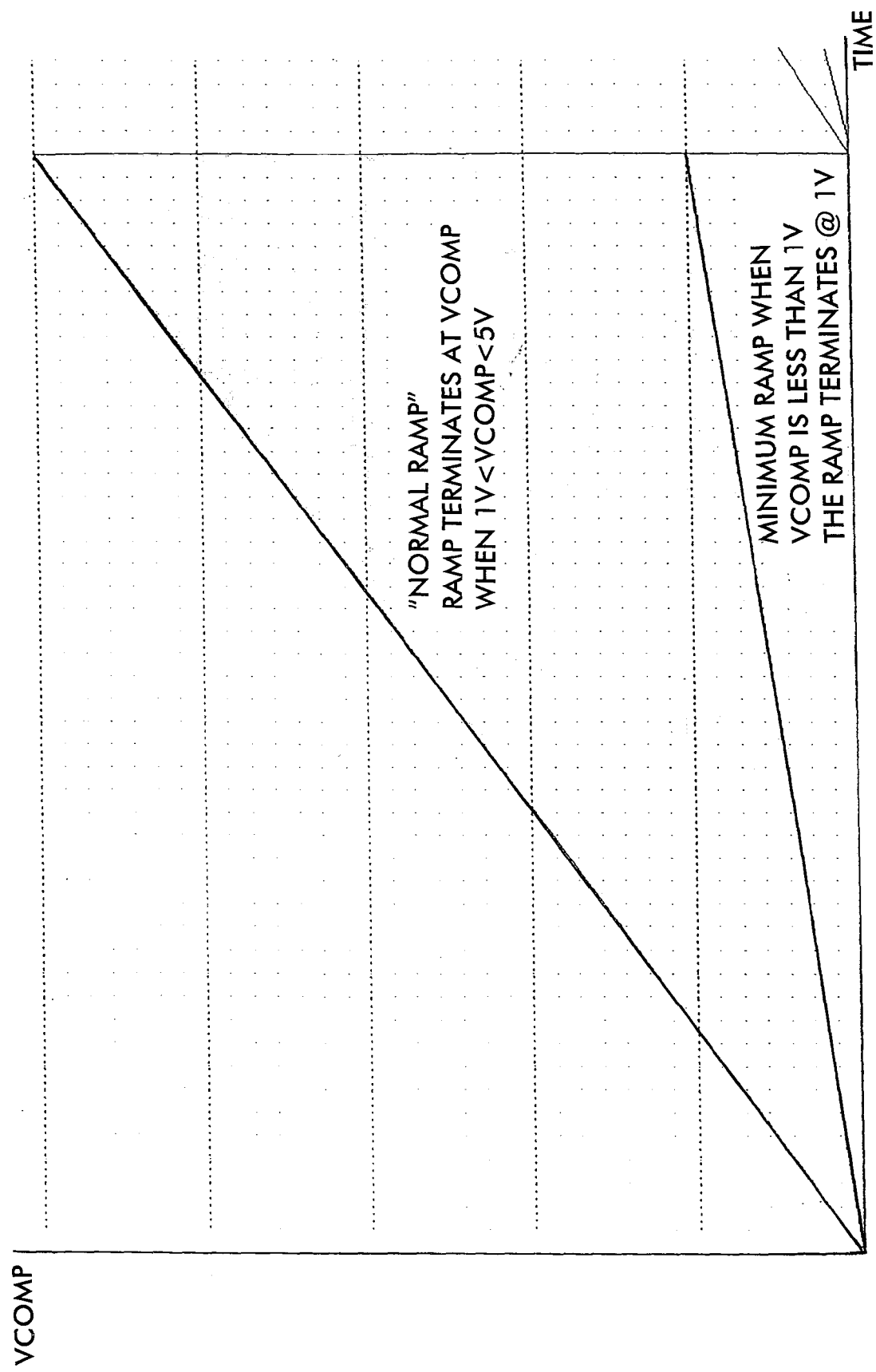
FIG. 5 shows ramp waveforms in the circuit of FIG. 4.

In the circuit of FIG. 4, the amplifier 50 receives two inputs: VCOMP and REF_MIN. VCOMP is, as before, the error amplifier EA output. The function of REF_MIN is shown in FIG. 5. When VCOMP is less than 1 V (REF_MIN), the ramp charge current and ramp peak are locked to a 1 V reference.

This stabilizes the clock to prevent the converter from malfunctioning. When the error voltage is less than 1 volt, the ramp terminates at 1 volt. This provides improved dynamic response.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A one cycle power factor correction converter circuit comprising:
   a switch for controlling a DC output voltage of the converter circuit, the switch being switched by a drive signal having a frequency determined by a clock signal having a clock period;
   the converter circuit being provided with a DC input voltage and producing said DC output voltage, the DC input voltage being rectified from an AC input;
   a controller circuit for controlling an on-time or off-time of the switch to set the output voltage and to achieve power factor correction at the AC input;
   the controller circuit comprising an error amplifier receiving a feedback voltage from the output voltage of the converter circuit and a reference voltage and producing an error signal;
   a ramp generator receiving said error signal and generating a first ramp signal by integrating a signal related to said error signal;
   a pulse width modulation circuit receiving said ramp signal and a signal related to said error signal and producing a pulse width modulated signal by comparing said first ramp signal and said signal related to the error signal, said pulse width modulated signal determining the on-time or off-time of said switch to control said output voltage with power factor correction; and
   further comprising a circuit for terminating said first ramp signal when a predetermined inequality exists between said first ramp signal and a reference signal and for developing said clock signal from said first ramp signal.

2. The converter circuit of claim 1, wherein the circuit for terminating said first ramp signal and developing said clock signal comprises:
   a comparator circuit receiving said first ramp signal and generating a first signal terminating said first ramp signal and a second signal initiating a second ramp signal, said first and second ramp signals having respective ramp times when the respective ramp signals are ramping, the clock period of said clock signal equaling the combined ramp times of said first and second ramp signals.

3. The converter circuit of claim 2, further wherein said comparator circuit generates a third signal to terminate said second ramp signal, said third signal or the inverse thereof being provided to a driver circuit driving said switch.

4. The converter circuit of claim 3, wherein said third signal or the inverse thereof is provided to a switch driver latch having an output driving said driver circuit.

5. The converter circuit of claim 4, wherein said third signal or the inverse thereof is provided to said switch driver latch by a pulse generator circuit.

6. The converter circuit of claim 5, wherein said pulse generator circuit receives the third signal as an input and generates a latch input signal for the switch driver latch to turn on the switch.

7. The converter circuit of claim 6, wherein said pulse generator circuit comprises a one shot timer circuit.

8. The converter circuit of claim 2, wherein said ramp generator comprises a first integrating capacitor having a second switch coupled across said first capacitor for discharging said first capacitor when said second switch receives said first signal.

9. The converter circuit of claim 8, further comprising an amplifier for converting said error signal into a current for setting a first current flowing into said first integrating capacitor to generate said first ramp signal.

10. The converter circuit of claim 9, further comprising a current mirror coupling an output of said amplifier and said first capacitor, whereby a current in an output circuit of said amplifier is mirrored to a first current source charging said first capacitor.

11. The converter circuit of claim 10, wherein the current in the output circuit of said amplifier is produced in a resistance.

12. The converter circuit of claim 11, wherein said resistance provides a voltage divider to develop said reference signal.

13. The converter circuit of claim 10, wherein said comparator circuit comprises first and second comparators, said first comparator receiving said first ramp signal and issuing said signal to terminate said first ramp signal when the first ramp signal equals the reference signal and said second comparator receiving the second ramp signal initiated at the termination of said first ramp signal and comparing said second ramp signal to the reference signal and issuing the third signal to restart the first ramp signal.

14. The converter circuit of claim 13, wherein the reference signal comprises a signal that bears a predefined linear relation to said first ramp signal.

15. The converter circuit of claim 14, wherein said reference signal comprises a preset fraction of said error signal.

16. The converter circuit of claim 13, wherein the second ramp signal is formed by charging a second capacitor from a second current source mirrored by said current mirror from said current in the output circuit of said amplifier.

17. The converter circuit of claim 16, wherein the second current source provides a current to the second capacitor which bears a predetermined ratio to the first current in the first capacitor, and the second capacitor has a predefined capacitance setting a capacitance ratio with said first capacitor so that the ramp times of said first and second ramp signals combined equal the clock period.

18. The converter circuit of claim 13, wherein said comparator circuit further comprises a latch circuit receiving outputs from said first and second comparators and generating said first and second signals.

19. The converter circuit of claim 1, further comprising a current sense amplifier receiving an output current signal of the converter circuit and generating a current sense signal; and a summing amplifier receiving the error signal and the current sense signal and subtracting the current series signal from the error signal to produce an adjusted error signal provided to said pulse width modulation circuit.

20. The converter circuit of claim 1, wherein said ramp generator receives two inputs, one of said inputs comprising said error signal and a second input comprising a reference signal, whereby, when said error signal is in a first range, said ramp generator produces the first ramp signal, and when said error signal is in a second range below said reference signal, said ramp generator produces a second variation of said first ramp signal having a reduced amplitude.

21. A method for generating a clock signal and ramp signal for a one cycle control power factor correction converter circuit producing an output voltage, comprising:
    generating a first ramp signal by integrating an error signal produced from a difference between an output voltage feedback signal of the converter and a reference voltage;
    generating a pulse width modulated signal by comparing the first ramp signal to the error signal to control a switch of the converter circuit to determine the output voltage;
    generating a second ramp signal at the termination of the first ramp signal; and
    generating a clock signal having a clock period for determining a switching frequency of the switch of said converter circuit from said first ramp signal and the second ramp signal.

22. The method of claim 21, wherein the first ramp signal has a ramp time when the ramp signal ramps, and the second ramp signal has a ramp time that is a predetermined fraction of the ramp time of the first ramp signal, whereby the first and second ramp signal ramp times equal the clock period.

* * * * *